Oct. 10, 1933.          R. C. ARTER          1,929,669
CONTROL SYSTEM FOR AUTOMATIC SUBSTATIONS
Filed July 24, 1922          6 Sheets-Sheet 1

R. C. Arter
INVENTOR.
BY Earl R. Evans
his ATTORNEY

Patented Oct. 10, 1933

1,929,669

UNITED STATES PATENT OFFICE 1,929,669

CONTROL SYSTEM FOR AUTOMATIC SUBSTATIONS

Roy C. Arter, Galion, Ohio, assignor to The North Electric Manufacturing Company, Galion, Ohio, a corporation of Ohio Application July 24, 1922. Serial No. 577,044

12 Claims. (Cl. 177—353)

My invention relates to systems for supervising and controlling the operation of apparatus such as the electrical equipment in automatic power substations from a remote point.

In automatic substations of this kind, the necessity for personal supervision of the apparatus therein is eliminated to a considerable extent by the provision of automatic controlling equipment which is responsive to the variations in the load upon the substation, and which is operative to control the generating units and connecting switches in accordance with these variations. There are however certain conditions which the automatic control does not meet satisfactorily. For instance, at certain times the load will fluctuate rather rapidly and cause the frequent shutting down and restarting of the substation. Obviously it would be desirable under these circumstances to maintain the station in operation.

Furthermore, the automatic control is inflexible in that it does not permit of varying operation to meet emergency conditions. The control is arranged to operate in a certain manner as required by the consideration of conditions arising in the ordinary operation of the substation. The conditions which obtain during an abnormal or emergency period, as for instance when there is a short-circuit in the distributing system, are radically different and it may be desirable that a change be made in the operation of the station. It is difficult, if not impossible, to provide for such emergencies in the automatic control, and it is the object of my invention to provide a simple and efficient arrangement whereby the apparatus in an automatic substation may be supervised and controlled manually when desired from a remote point. Where there are a number of automatic substations, the supervisory and controlling equipment for all of the stations may be located at a central point which may be at a distance from all of the stations.

According to my invention, there is provided at the control station supervisory apparatus for indicating the condition of certain apparatus units at the substations. At each substation, there is a group of switching relays and control relays. A two-wire trunk connects each substation with the control office and associated with each end of the trunk is a register or counting relay chain. When one of the apparatus units at a substation is operated, by the automatic control or otherwise, the group of switching relays is selectively operated to seize the unit and to set the register in accordance with the unit seized. The control office register is then rendered operative. An interrupting relay in the control office operates both registers simultaneously until the substation register is restored to normal, the control of the substation register being effected by revertive current impulses transmitted over the said two-wire trunk. According to the position of the control office register, switching relays at the control office are operated to change the supervisory signals to correspond to the change which originally took place at the substation, whereupon the switching apparatus is restored to normal in readiness to transmit the supervisory signals corresponding to changes which have taken place in the interim or which take place subsequently. Where there are many signals to be controlled, the described switching operations take place in steps, a series of controlling impulses being sent at each stage of the switching operation. A plurality of series of impulses may be sent in this manner in a few seconds to permit the selection and operation of any one of a hundred or more signals.

According to a further feature of my invention, a keyset or controlling device is provided at the control office for selecting and operating a desired apparatus unit at the substation over a second trunk. After the desired apparatus unit is selected, a supervisory signal corresponding to the proposed operation is transmitted back to the control office, thereby providing a check upon the operation of the controlling apparatus. The operation may then be performed or the control apparatus released without operating if desired.

Other objects of my invention will become apparent from the following description taken in connection with the accompanying drawings which illustrate a system embodying the invention.

Referring to the drawings, Fig. 1 illustrates the general arrangement of the apparatus at one of the substations.

To increase the certainty of the operation of the system, I prefer to use simple electro-magnetic relays for switching purposes. Relays of this kind are very reliable on account of their simplicity. They do not require frequent adjustment and care, as do more complicated switching devices, and they are not appreciably affected by changes of temperature or humidity. The detailed construction of relays of this type is well known and needs no description.

Certain of the relays employed are slow-release relays, which are constructed by placing a copper sleeve upon the core of the relay, and I have illustrated the relays of this type upon the drawings by a convention which is suggestive of this construction.

In the following, general description of the operation, the circuits will not be traced in detail in order to avoid crowding description with detailed circuits. The circuits will be traced in detail later in the detailed description of the operation.

General description of the operation

Figure 1:
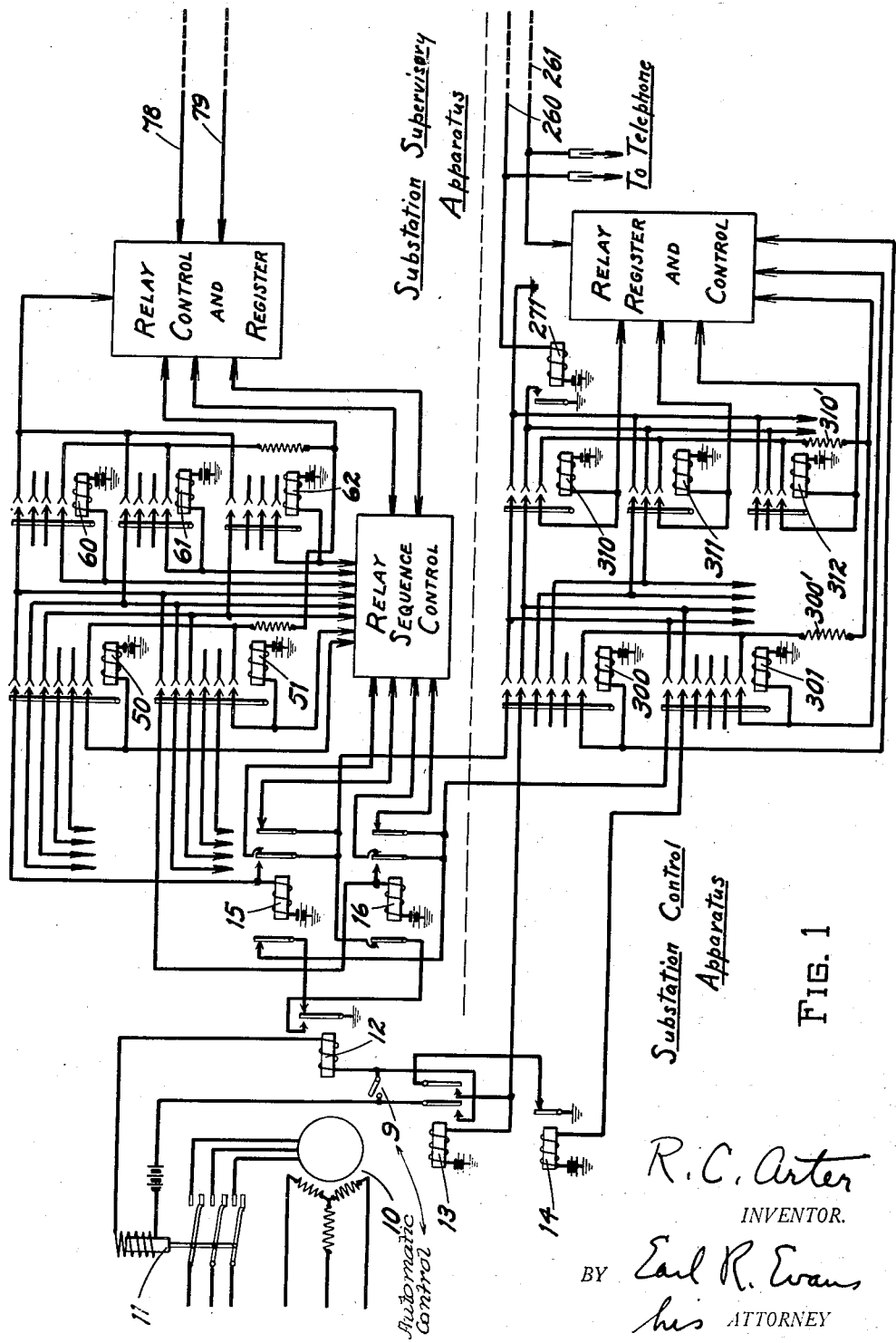

Referring to Fig. 1, in the upper half of this figure is shown the general arrangement of the supervisory apparatus at the substation. A translating device 10, at the substation, is controlled by the contactor 11. The contactor 11 is controlled by the automatic controlling apparatus, represented by the contacts 9, in accordance with the load upon the substation. In series with the energizing coil of the contactor 11 is the supervisory relay 12, which becomes energized whenever the contactor 11 becomes energized. The condition of the supervisory relay 12 therefore is indicative of the condition of the contactor and also of the translating device 10. It will be understood that a number of relays like 12 are provided and connected so as to indicate the various operations which it is desired to supervise. The contacts of all of these relays operate corresponding supervisory signals at the control office.

Figure 2:
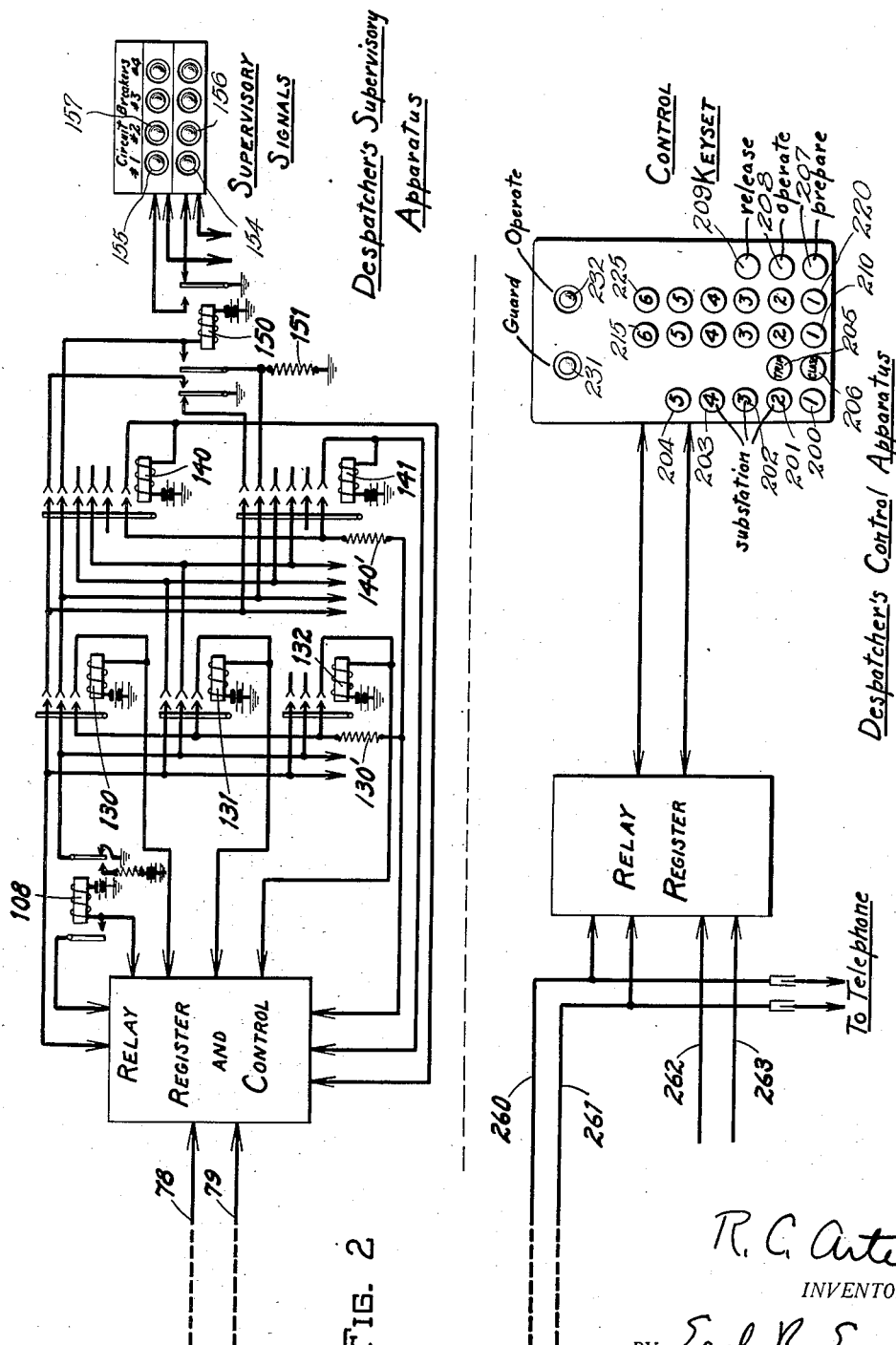
Fig. 2 illustrates the general arrangement of the apparatus at the control office.

Upon the energization of relay 12, a circuit is closed from ground through its armature and front contact, the left hand armature and back contact of relay 16, the right hand armatures and back contacts of relay 15, the relay sequence control, the relay control and register at the substation, the trunk 78, 79 to the control office (Fig. 2) and the relay register at the control office. Switching relays 50 and 60 are operated by the relay control to seize the relay 15, which corresponds to the described energized condition of relay 12. The relay sequence control prevents confusion in case other changes occur at the substation before the described signal is transmitted and the common switching apparatus released.

The switching relays 50 and 60 are arranged substantially as described in U. S. Patents #939,186, 939,187, and 939,188 to E. E. Clement. The contacts of the group or primary relays 50, 51, etc., are connected to groups of relays like 15 and 16, and the contacts of the individual or secondary relays 60, 61, 62, etc., are multiplied to the contacts of all of the group relays, so that any relay like 15 is connected to the relay control upon the energization of a primary and a secondary relay. Thus relay 15 is seized upon the energization of relays 50 and 60, whereas the relay 16 is seized upon the energization of relays 51 and 60.

The relay register at the substation is set according to the arbitrary numerical designation of relay 15, and is then restored to normal by revertive current impulses transmitted over the trunk 78, 79 from the control office. The register at the control office counts the number of impulses required to restore the substation register and controls a switching operation in accordance with this number to select the desired supervisory signal. The registers are arranged to operate successively according to successive series of controlling impulses in order to effect a wide selection rapidly and with small registers. Each series of impulses constitutes a stage of the switching operation. Thus one series effects the operation of the primary relay 140 or 141, and another of the secondary relay 130, 131 or 132, these relays being arranged like the switching relays at the substation.

Upon the operation of relays 140 and 130, corresponding to relays 50 and 60, a circuit is closed through the back contact of relay 108 and the contacts of relays 130 and 140 for operating relay 150. The relay 150 operates the supervisory signal corresponding to the change which has taken place at the substation. The supervisory signals are lamps, such as telephone switchboard lamps arranged in two rows with an adjacent strip bearing the designations of the lamps. Each pair of lamps represents one apparatus unit and each lamp of the pair represents a different condition of the said unit; i. e. one lamp which may be red represents the closed position of a switch or the operating condition of a machine, while the other lamp of the pair which may be white or green represents the opposite condition. The relay 150 becomes locked up through its middle armature and front contact and operates the relay control 110 to release the relays like 130 and 140, which have been locked up through their lower contacts and the locking resistances 130' and 140'. Other relays like 150 are provided for controlling each pair of supervisory signals.

The relay 15 is then energized through a circuit including the contacts of relays 50 and 60, and locks up through its middle armature and front contact to ground at the armature and front contact of relay 12. Upon the operation of relay 15, the described control circuits are interrupted in its armatures and back contacts, whereupon the relays 50 and 60 become de-energized and the substation supervisory equipment is restored to normal in readiness to transmit other signals. The described transmitting operation is effected in two or three seconds.

If the relay 12 now becomes de-energized, due to the opening of the circuit of contactor 11, which is in series with relay 12, the relay 15 becomes de-energized, when its locking circuit is interrupted at the first contact of relay 12 and a control circuit is closed through the armatures and back contacts of relay 16 for initiating the transmission of the desired signal, which takes place in substantially the same manner as in the case of the "closed" supervisory signal. Relays 51 and 60 become energized, whereupon the corresponding relays 141 and 130 at the control office become energized. Relay 108 becomes energized and a circuit is closed from grounded battery through the armature and front contact of this relay, the contacts of relays 130 and 141, and resistance 151 to ground. This path is in shunt to the relay 150, and the latter becomes de-energized, changing the supervisory signals to correspond to the open position of the contactor 11. Release of the supervisory equipment is now effected as before.

Let us assume that the contactor 11 is open, and the operator at the control office wishes to close the same and start the machine 10. He accomplishes this by means of his keyset, illustrated in the lower half of Fig. 2. The trunk leading to the desired substation is first associated with the control register by the operation of the corresponding substation key in the left hand column of the keyset. Let us assume that the trunk 260, 261 is thus selected, trunks like 262, 263 leading to other substations being disconnected. The guard lamp on the keyset becomes lighted and remains in this condition until the sending operation is completed and the apparatus released.

The desired operation is now selected by the actuation of the proper keys in the second, third and fourth columns of the keyset. I prefer to arrange the keyset and the apparatus in the substations controlled thereby so that the same keys will cause similar operations to take place in any substation. The keys may then bear suitable inscriptions, such as start, stop, close or trip, and certain numbers corresponding to arbitrary numbers assigned to the various apparatus units at the substation. With the aid of a chart showing the numbering of the machines and switches at the substation, the operation becomes a simple matter.

The prepare key is now depressed, whereupon a plurality of series of current impulses is transmitted over the control trunk 260, 261 to effect a switching operation at the substation. The relay register at the control office is set in accordance with the adjustment of the keys of the keyset, and then restored to normal by revertive current impulses from an interrupting relay at the substation. The substation relay register counts the number of impulses in each series required to restore the control office register, and selectively actuates the switching relays 300, 310 in accordance with this number. Upon the operation of relays 300 and 310 corresponding to the actuated keys in the keyset, ground is placed through the upper contacts of these relays to the armatures of relay 15, whereupon a supervisory signal is transmitted to the control office as though the desired operation had already been effected. This provides a check upon the operation of the controlling apparatus. At this stage of the operation, the operate lamp on the keyset is lighted to indicate that the circuit is ready for the final step.

The operator may now either effect the desired operation or release the apparatus. The former is accomplished by depressing the operate key on the keyset. The relay 271 at the substation becomes energized and closes an energizing circuit through the contacts of relays 310 and 300 for relay 13. The relay 13 becomes locked up through its outer armature and front contact to ground at the armature and back contact of relay 14 and closes the energizing circuit of the contactor 11. The control apparatus at the substation and control office is now released by depressing the release key, when the supervisory signal indicates that the desired operation has been completed. The relay 14 may be operated subsequently from the control office to unlock the relay 13 when desired in exactly the same way that relay 13 was operated.

If the operator elects to release the apparatus without effecting any operation, he depresses the release key, whereupon the controlling apparatus at the control office and substation is restored to normal. Upon the de-energization of relays 300 and 310, the supervisory signal is changed to indicate the actual condition of the contactor 11.

*Detailed description of the operation*

Upon the closure of the contactor 11, relay 12 (Figs. 1 and 3) becomes energized. A circuit is now closed from ground through the armature and front contact of relay 12, the left hand armature and back contact of relay 16, the middle armature and back contact of relay 15, the fifth contacts of relay 18', the outermost contacts of relay 17, and the winding of relay 21 to grounded battery. Relay 21 becomes energized, locks up through its left hand armature and front contact to ground at the armature and back contact of relay 71, and closes through its middle armature and front contact an energizing circuit for the relay 17 from ground, middle armatures and their back contacts of relays 20—22 in series, middle armature and front contact of relay 21, winding of relay 17, and battery to ground. Relay 17 becomes energized and opens the circuits to the control relays 21—20 to prevent the seizure of another of these relays, until the operation being described has been completed.

Another circuit is closed through the right hand outer armature and front contact of relay 21, and the winding of relay 18' to grounded battery. Relay 18' becomes energized and closes a circuit from ground through its outermost contacts and the winding of relay 18 to grounded battery. Relay 18 becomes energized, whereupon a circuit is closed from ground at relay 12 through the outer right hand armature and back contact of relay 15, the outermost contacts of relays 18 and 17' and the winding of relay 31 to grounded battery. Relay 31 becomes energized, locks up through its left hand armature and front contact to ground at relay 71 and closes through its middle armature and front contact an energizing circuit for relay 17'. Relay 17' becomes energized, opening the circuits of relays 31—30 to prevent the seizure of any of these control relays before the operation being described is completed.

A circuit is now closed from ground through the innermost contacts of relay 17', the middle armature and back contact of relay 72, the second contacts of relay 18 and the winding of relay 40 to grounded battery. Relay 40 becomes energized, whereupon the following circuits are closed: from ground through the innermost contacts of relay 18, the upper contacts of relay 40 and the winding of relay 50 to grounded battery; from ground through the right hand outer armatures and back contacts of relays 30—32, the right hand outer armature and front contact of relay 31, the fifth contacts of relay 40 and the winding of relay 60 to grounded battery; and from ground through the left hand outer armature and back contact of relay 72, the lower contacts of relay 40 and the winding of relay 80' to grounded battery. Relays 50, 60 and 80' become energized.

A circuit is now closed from ground through the left hand outer armature and back contact of relay 74, the right hand outer armature and front contact of relay 80' and the winding of slow relay 77 to grounded battery. Relay 77 becomes energized and closes through its left hand outer armature and front contact the energizing circuit of relay 72 from ground through battery, winding of relay 72, contact of relay 60, outer left hand contact of relay 77, its armature to ground. Relay 72 becomes energized and opens in its left hand armature and back contact the described energizing circuits of relays 40 and 80'.

The relay 80' remains locked up however through its middle armature and front contact to ground at the armature and back contact of relay 74. Upon the de-energization of relay 40, the described energizing circuits of relays 50 and 60 are broken, but these relays remain locked up through their lower contacts to ground at the left hand outer armature and front contact of relay 72.

A circuit is now closed from ground through the left hand outer armature and front contact of relay 72, the winding of relay 70, conductor 78 extending to the control office, the left hand armature and back contact of relay 100 and the winding of relay 103 to grounded battery. Relays 70 and 103 become energized, whereupon a circuit is closed from grounded battery, through the winding of relay 76, the right hand armatures and back contacts of relays 74 and 73, the lower armature and front contact of relay 70, conductor 79 extending to the control office, the left hand armature and back contact of relay 101, the winding of relay 102, the inner armature and front contact of relay 103 and the normal contacts of relay 104 to ground. Relays 76 and 102 become energized. A circuit is now closed from ground through the left hand outer armature and back contact of relay 74, the armature and front contact of relay 76, the left hand armature and front contact of relay 80', and the winding of relay 80 to grounded battery.

Another circuit is closed from ground through the outer armature and front contact of relay 103, the left hand armature and back contact of relay 106, the armature and front contact of relay 102, the middle armatures and back contacts of relays 119'—110', and the winding of relay 110 to grounded battery. Relays 80 and 110 become energized. Upon the energization of relay 110, a circuit is closed from ground through the outer right hand armatures and back contacts of relays 119'—110', the outer right hand armature and front contact of relay 110 and the winding of relay 101 to grounded battery. Relay 101 becomes energized and closes a circuit from ground at relay 103 through its right hand armature and front contact and the winding of slow relay 107 to grounded battery. Relay 107 becomes energized and closes the following circuits: from ground at relay 106 through its middle armature and front contact and the winding of relay 104 to grounded battery; and from ground at the relay 103 through its outer right hand armature and front contact, the lower armatures and back contacts of relays 120, 122 and 124, and the winding of relay 125 to grounded battery. Relays 104 and 125 become energized. Relay 104 locks up through its left hand armature and front contact and the left hand armature and back contact of relay 106 to ground at relay 103, and opens in its right hand make-before-break contacts the described energizing circuit of relays 76 and 102. These relays are now energized through the make contact of relay 104 to ground at the left hand armature of relay 107. The relay 125 locks up through its lower contact and front contact, and the lower armatures and back contacts of relays 123 and 121 to ground at the relay 103.

Upon the energization of relay 101 as described, relays 76 and 102 become de-energized, whereupon a circuit is closed from ground through the left hand outer armature and back contact of relay 74, the armature and back contact of relay 76, the right hand armature and front contact of relay 80 and the winding of relay 74 to grounded battery. Relay 74 becomes energized and locks up through its middle armature and front contact and the middle armature and front contact of relay 77 to ground. At the same time a circuit is closed from ground at the outer armature of relay 103, through the left hand armature and back contact of relay 106, the armature and back contact of relay 102, the left hand armatures and back contacts of relays 119—111, the left hand armature and front contact of relay 110, and the winding of relay 110' to grounded battery. Relay 110' becomes energized and locks up through its left hand armature and front contact and the left hand armatures and back contacts of relays 111'—119', the right hand armature and back contact of relay 106 and the outer armature and front contact of relay 103 to ground.

Upon the operation of relay 74 as described, the locking circuits of relays 80 and 80', and the energizing circuit of relay 77, are interrupted, whereupon these relays become deenergized. A circuit is now closed from ground through the left hand outer armature and front contact of relay 74 and the winding of slow relay 75 to grounded battery. Relay 75 becomes energized and closes through its right hand armature and front contact the energizing circuit of slow relay 73. Relay 73 becomes energized and holds the circuit of relays 76 and 102 open. Upon the energization of relay 75 another circuit is closed from ground at the relay 72, through the left hand armature and front contact of relay 75, the right hand armatures and back contacts of relays 45 and 43, and the winding of relay 42 to grounded battery. Relay 42 becomes energized and locks up through its right hand armature and front contact and the right hand armature and back contact of relay 44.

The first series of impulses has now been sent and the apparatus at the substation (Fig. 3) now waits until the first stage of the switching operation is completed at the control office. This occurs as follows: upon the energization of relay 110' as described, the circuit of relay 101 is interrupted and this relay becomes de-energized and breaks the circuit of relay 107. Upon the de-energization of relay 107 a circuit is closed from ground at relay 103 through the right hand outer armature and back contact of relay 107, the upper armatures and back contacts of relays 121 and 123, the upper armature and front contact of relay 125 and the winding of relay 124 to grounded battery. Relay 124 becomes energized, locks up through its middle armature and front contact and the middle armatures and back contacts of relays 122 and 120 to ground at relay 103. Through its upper armature and front contact the relay 124 closes a circuit from ground at the outer right hand armature of relay 106 for energizing relay 158. Upon the energization of relay 158 a circuit is closed from ground at the right hand outer armature of relay 119' through the right hand outer armatures and back contacts of relays 119—111, the right hand outer armature and front contact of relay 110', the middle armature and front contact of relay 158 and the winding of relay 160 to grounded battery. Relay 160 becomes energized, locks up through its left hand armature and front contact, resistance 126, and the outer armature and front contact of relay 103 to ground. This constitutes the first stage of the switching operation at the control office.

If a different number of controlling impulses had been transmitted between the control office and the substation for this stage of the operation, a different number of counting relays in the relay register 110—119 would have been operated. This would have resulted in the energization of different relays to correspond to the different signal being transmitted, as will appear.

Upon the operation of relay 160 a circuit is closed from ground at the armature of relay 119' as traced before through the left hand armature and front contact of relay 160, the outer right hand armature and front contact of relay 158 and the winding of marginal relay 106 to grounded battery. The marginal relay 106 becomes energized and opens in its armatures and back contacts the locking circuits of relays 104, 110 and 110'. The relay 106 is adjusted so that it is not actuated in series with resistance 126. The register in the control office is now restored to normal in readiness for operation in accordance with further stages of the switching operation. The operation of relay 106 causes the de-energization of relay 158, whereupon relay 106 is de-energized.

Upon the energization of relay 42 as described, a circuit is closed from ground through the outer armatures and back contacts of relays 77, 45, 44 and 43, the left hand outer armature and front contact of relay 42, the second contacts of relay 50, and the winding of relay 80' to grounded battery. Relay 80' becomes energized and locks up through its middle armature and front contact to ground at relay 74. Upon the de-energization of relay 75 a circuit is closed from ground at the left front contact of relay 72, through the left hand armature and back contact of relay 75, the middle armature and back contact of relay 44, the middle armature and front contact of relay 42, and the winding of relay 43 to grounded battery. Relay 43 becomes energized and locks up through its middle armature and front contact to ground at relay 72. A circuit is now closed from ground at the relay 74 through the outer right hand armature and front contact of relay 80' and the winding of slow relay 77 to grounded battery. Upon the de-energization of slow relay 73, the control circuit including impulse relays 76 and 102 is re-established. The adjustment of the slow relay 73 is such that this circuit is not completed until the register at the control office (Fig. 4) is restored as described. Upon the energization of relays 76 and 102, relays 80 and 110 become energized as described above. The energization of relay 110 closes the circuit of interrupting relay 101 as before, whereupon the impulse relays 76 and 102 becomes de-energized and relay 107 becomes energized, causing in turn the energization of relay 123. Upon the de-energization of relay 102, relay 110' becomes energized. Upon the de-energization of relay 76, relay 74 becomes energized as before to interrupt the series of controlling impulses and to restore the register 80—89' to normal. Relay 75 becomes energized and closes the circuit of relay 73, which prevents the sending of further impulses until the second stage of the operation is completed.

Upon the energization of relay 110', as described, relay 101 becomes de-energized, causing the de-energization of relay 107 as described above. Through its right hand outer armature and back contact, relay 107 closes the energizing circuit of relay 122. Relay 122 locks up through its middle armature and front contact middle and back contact of relay 120 to ground at relay 103, and closes a circuit from ground at relay 106 through the middle armature and back contact of relay 107, the upper armature and front contact of relay 122, the right hand armature and front contact of relay 160 and the winding of relay 129. Upon the energization of relay 129, a circuit is closed from ground through the right hand outer armatures and back contacts of relays 119'—111, the right hand outer armature and front contact of relay 110', the outermost contacts of relay 129, and the winding of relay 140 to grounded battery. Relay 140 becomes energized and closes a circuit from ground at relay 119' through the above described circuit and its lower contacts, the innermost contacts of relay 129 and the winding of the marginal relay 106 to grounded battery. Relay 106 becomes energized and unlocks relays 104, 110, 110' and 129, whereupon the register is restored to normal. Relay 140 remains locked up through its lowermost contacts and locking resistance 140' to ground at relay 103. Relay 129 opens the circuit of relay 106, whereupon this relay is restored to normal.

The third series of controlling impulses is now sent. Upon the energization of relay 75, as described above, a circuit is closed from ground at relay 72 through the left hand armature and front contact of relay 75, the right hand armature and back contact of relay 45, the right hand armature and front contact of relay 43 and the winding of relay 44 to grounded battery. Relay 44 becomes energized, locks up through its right hand armature and front contact, and opens in its right hand armature and back contact the locking circuit of relay 42, whereupon this relay becomes de-energized.

A circuit is now closed from ground through the outer left hand armature and back contact of relay 77, the left hand armature and back contact of relay 45, the left hand armature and front contact of relay 44, the second contacts of relay 60 and the winding of relay 80' to grounded battery. Relay 80' becomes energized, locks up through its middle armature and front contact to ground at relay 74, and closes through its right hand outer armature and front contact an energizing circuit for relay 77. Relay 77 becomes energized and breaks in its outer left hand armature and back contact the described energizing circuit for relay 80'.

Upon the subsequent de-energization of relay 75, a circuit is closed from ground at relay 72 through its left hand armature and back contact, the middle armature and front contact of relay 44 and the winding of relay 45 to grounded battery. Relay 45 becomes energized, locks up through its middle armature and front contact, and opens in its middle armature and back contact the locking circuit of relay 43, whereupon this relay becomes de-energized.

Upon the restoration of relay 73, the controlling circuit extending from the substation to the control office is re-established. Relays 76 and 102 are re-energized, and cause the energization of relays 80 and 110 as described. The energization of relay 110 energizes relay 101, which interrupts the controlling circuit and causes the de-energization of relays 76 and 102. The relay 76 closes a circuit through its back contact and the front contact of relay 80 for energizing relay 74, whereupon the relays 80, 80' and 77 become de-energized, and relay 75 becomes energized. A circuit is now closed from ground at relay 72 through the left hand armature and front contact of relay 75, the right hand armature and front contact of relay 45, and the winding of relay 46 to grounded battery. Relay 46 becomes energized, locks up through its inner armature and front contact, and closes through its outer armature and front contact an energizing circuit for relays 71 and 15 which includes contacts of relays 50 and 60. Relays 71 and 15 become energized, the latter locking up through its middle armature and front contact to ground at relay 12. The energization of relay 15 breaks the described energizing circuits of relays 21 and 31 but these relays remain locked up to ground at the armature and front contact of relay 70. The energization of relay 71 breaks the described locking circuit of relay 72 but this relay remains locked up to ground at the relay 70. The control apparatus at the substation (Fig. 3) therefore is not restored to normal until the relay 70 is operated from the control office after the apparatus therein has completed its function.

Upon the energization of relay 101, as described, relay 107 becomes energized and closes the circuits of relays 104 and 121. Relay 121 locks up through its lower armature and front contact to ground at the relay 103, and opens in its lower armature and back contact the locking circuit of relay 123, whereupon this relay becomes de-energized.

Upon the de-energization of relay 102, as described, relay 110' becomes energized, and breaks the circuit of relay 101. Upon the subsequent de-energization of relay 107, a circuit is closed from ground at relay 103 through the outer right hand armature and back contact of relay 107, the middle armature and front contact of relay 121, and the winding of relay 120 to grounded battery. Relay 120 becomes energized and at its middle armature closes a locking circuit for itself and opens the locking circuit of relay 122, whereupon this relay becomes de-energized.

A circuit is now closed from ground through the right hand outer armature and back contact of relay 106, the middle armature and back contact of relay 107, the upper armature and front contact of relay 120, and the winding of relay 127 to grounded battery. Relay 127 becomes energized, whereupon a circuit is closed from ground through the right hand outer armatures and back contacts of relays 119'—111, the right hand outer armature and front contact of relay 110', the outer contacts of relay 127 and the winding of relay 130 to grounded battery. Relay 130 becomes energized, whereupon the following circuits are closed:—from ground at relay 119' through the above described circuit, the lower contacts of relay 130, the innermost contacts of relay 127 and the winding of the marginal relay 106 to grounded battery; and from ground through the outer armature and back contact of relay 108, the second contacts of relay 130, the sixth contacts of relay 140 and the winding of relay 150 to grounded battery.

Relays 106 and 150 become energized. Relay 106 opens the holding circuits of relays 104, 110 and 110', and the energizing circuit of relay 127, and these relays become de-energized. Relays 110' and 127 break the circuit of relay 106, and this relay is restored to normal. Relay 130 remains locked up through the locking resistance 130' to ground at relay 103.

Upon the energization of relay 150, a circuit is closed from ground through the outer right hand armature and front contact of relay 150 and the lamp 155 to grounded battery. The lamp 155 is lighted and serves to indicate the closed position of the contactor 11. Another circuit closed upon the energization of relay 150 extends from ground through its middle armature and front contact, the uppermost contacts of relays 140 and 130, and the winding of relay 100 to grounded battery. The relay 100 becomes energized and releases the relays at the substation and the control office with the exception of relays 15 and 150, the latter being locked up through its left hand armature and front contact and the resistance 151 to ground. Upon the operation of relay 100, relays 70 and 103 become de-energized. Upon the de-energization of relay 70, relays 72, 21 and 31 become de-energized, causing in turn the de-energization of relays 50, 60, 45, 46, 71, 17, 17', 18', and 18. Upon the de-energization of relay 103, relays 130, 140, 120 and 121 become de-energized. The apparatus at the substation (Fig. 3.) and the control office (Fig. 4) is now restored to normal in readiness to transmit other signals.

When the contactor 11 is subsequently opened, thereby de-energizing relay 12, the described locking circuit of relay 15 is broken and this relay becomes de-energized. Ground is now placed through the back contacts of relays 12 and 15 to the right hand armatures of relay 16, whereupon the control relays are seized and the transmission of the signal is commenced in a similar manner to that described in connection with relay 15. Relays 15 and 16 are allotted to separate primary relays 50 and 51 and to the same secondary relay 60. Other relays like 15 and 16, 15' and 16', for instance, are connected to other contacts of the primary relays 50 and 51 respectively, and to secondary relay 61. The upper contacts of relays 50 and 51 are multiplied together and are connected in order to the upper contacts of relays 60, 61, 62, etc. The lower contacts of relays 50, 60, etc. are connected so as to form holding circuits for these relays, as shown. In addition, a circuit through each of these relays is completed for variably setting the register 80—89'. Thus the second contacts of relay 50 are connected to the winding of the second register relay 80', the second contacts of relay 51 to the fourth relay 81'; and the second contacts of relays 60, 61 and 62 to the second, fourth and sixth relays 80', 81' and 82'. Other primary relays like 50, 51 and secondary relays like 60 are provided and similarly connected, depending upon the number of relays 12, 12', etc., required.

Two relays like 18 and 18', 19 and 19', etc., are provided for each primary relay like 50 and 51. Relays 21, 22, etc., are each individual to the primary relays 50, 51, etc., and relays 31, 32, etc., are each individual to the secondary relays 60, 61, etc. The primary control relays 21, etc. lock up depending upon the group in which the relay 15 or 16, etc. is located, and cause the operation of the corresponding primary or group relay 50 or 51. The secondary control relays 31, etc., lock up depending upon the position of the relay 15 or 16, etc., in the group, and cause the operation of the corresponding secondary relay 60, 61 or 62. The primary and secondary relays 50 and 60 control as described above the setting of the register for governing the primary and secondary stages of the switching operation.

In addition, there is a preliminary series of impulses depending upon the kind of change the apparatus unit has undergone; i. e., whether the contactor has opened or closed. As we have seen, relay 15 or 16 is operated depending upon whether the contactor 11 is closed or opened, and this in turn operates relay 50 or 51. Relay 50 is energized through a circuit including the uppermost contacts of relay 40 and the innermost contacts of relay 18, the relay 18 being individual to the relay 50 and the relay 40 being individual to the alternate primary relays like 50. As described above, in the event that relays 40 and 50 or another relay like 50 are energized, a register-setting circuit is closed from ground at relay 72 through the lower contacts of relay 40 to the winding of register relay 80'. This causes the sending of a preliminary series of impulses, operating the counting relays 110 and 110' in the control office register. This results in the energization of relay 160, as we have seen, which causes the subsequent energization of control relay 129.

On the other hand, the relay 51 is energized through a circuit including the uppermost contacts of relay 41 and the innermost contacts of relay 19, the relay 19 being individual to the relay 51 and the relay 41 being individual to the alternate relays like 51. In the event that relays 41 and 51 or another relay like 51 are energized, a register-setting circuit is closed from ground at relay 72 through the lower contacts of relay 41 to the winding of relay 81'. This causes the sending of a preliminary series of impulses, operating the relays 110, 110', 111 and 111' in the control office register. This results in the energization of primary control relay 128 and relay 108 in parallel therewith. The operation proceeds as before, except that battery has now been placed upon the outer armature of relay 108. When the relay 150 has been selected by the primary and secondary switching relays 130 and 141, this relay is unlocked by the shunt circuit from its locking contact to battery at relay 108. The relay 150 becomes de-energized, extinguishes lamp 155, lights lamp 154, and closes the circuit of release magnet 100 through its middle armature and back contact and the upper contacts of relays 141 and 130. The lamp 154 remains lighted to indicate the open condition of the contactor 11 until it is again operated as described upon a subsequent closure of the contactor.

Figure 5:
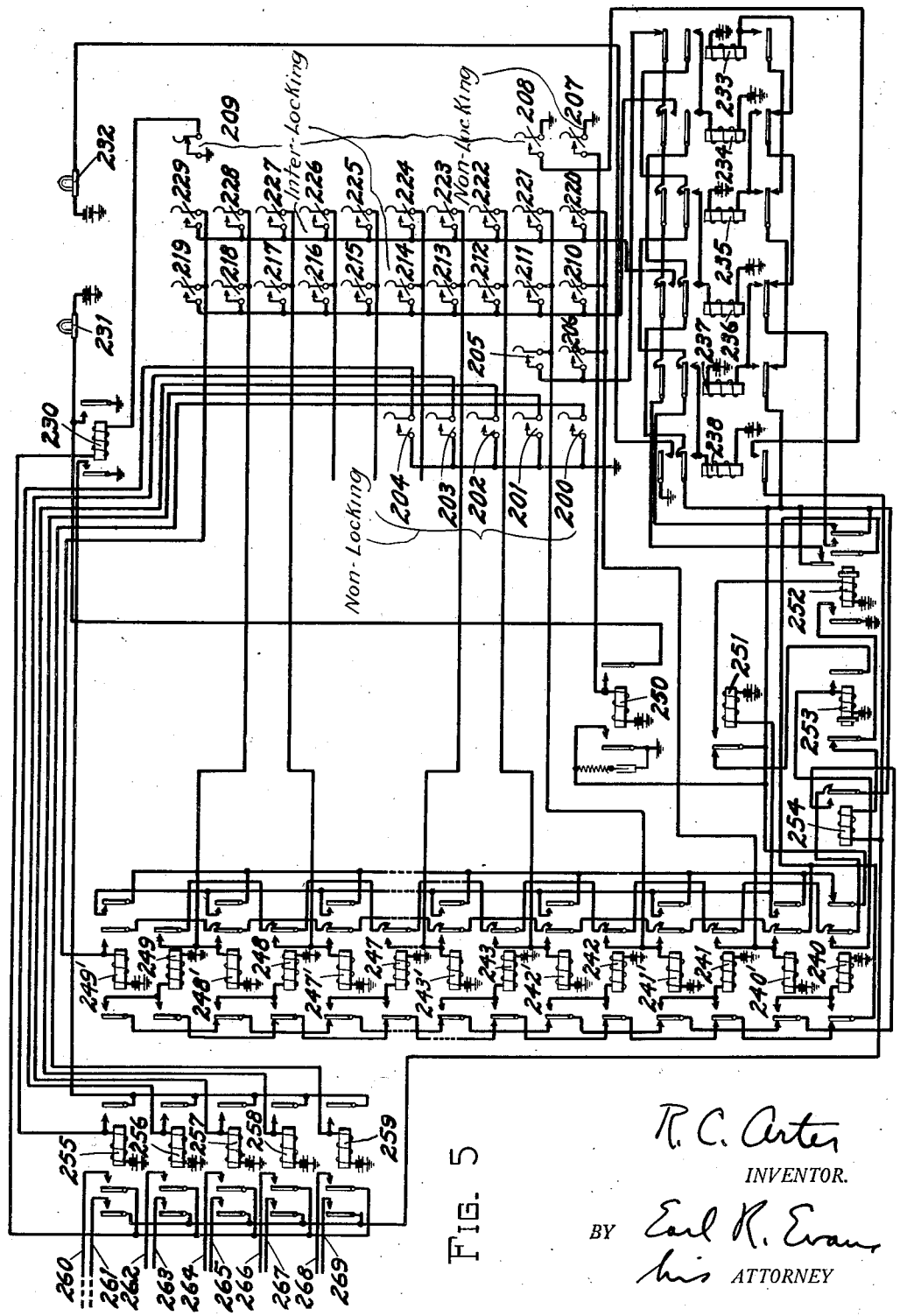
Figs. 5 and 6 illustrate the detailed circuits and apparatus at the control office and substation respectively for controlling the substation equipment, as shown in outline in the lower halves of Figs. 1 and 2.
Figure 6:
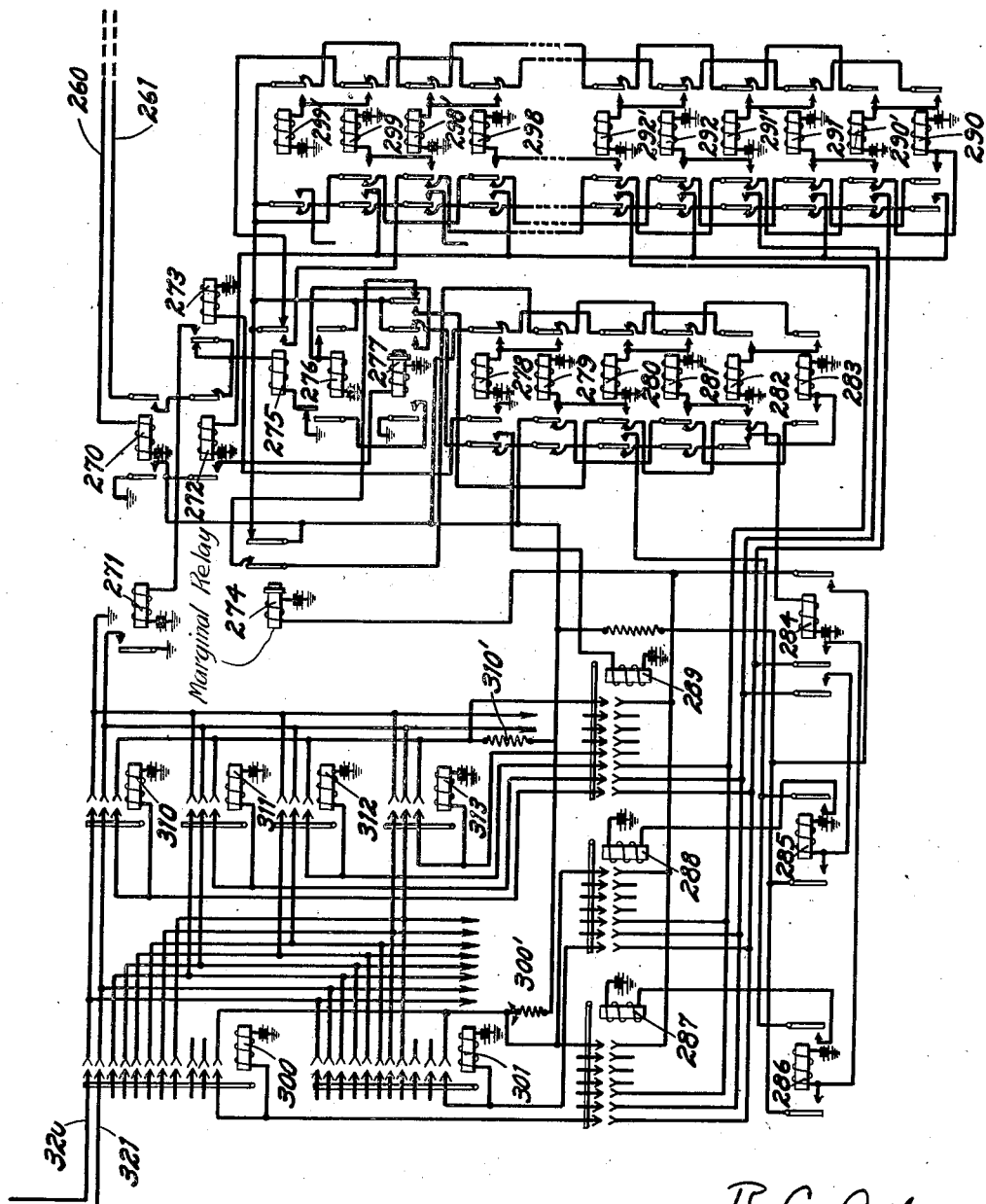

The control of apparatus at the substation from the control office is effected as follows:— Suppose the contactor 11 is open and the despatcher or operator at the control office desires to close the same regardless of the operation of the automatic controlling apparatus. Referring to Figs. 5 and 6 the desired substation is selected by actuating the contacts of key 204. A circuit is closed from ground through the contacts of this key and the winding of relay 255 to grounded battery. The relay 255 becomes energized and connects the trunk 260, 261, leading to the desired substation to the control keyset. The relays 256, 257, 258 and 259 are similarly controlled by the keys 200—203 and serve to connect trunks 262, 263, etc., leading to other substations to the keyset.

Upon the energization of relay 255, a circuit is closed from ground through the normally closed contacts of the release key 209, the winding of relay 230, the middle armature and front contact of relay 255, conductor 260 extending to the substation, and the winding of relay 270 to grounded battery. Relays 230 and 270 become energized, the former closing through its left hand armature and front contact a locking circuit for relay 255, and through its right hand armature and front contact an energizing circuit for the guard lamp 231. This lamp indicates that a trunk has been connected to the keyset, and remains lighted until the keyset is restored to normal after the sending operation, and the trunk is released.

The keys 200—204 and 207 are non-locking keys which close their contacts momentarily when the operating buttons are depressed. The other keys 205, 206, 208, 209, and 210—229 are arranged in four rows as shown, and are interlocked by rows. The actuation of a key in any of these rows unlocks any key that has been depressed and in turn locks in its actuated position until the subsequent operation of another key in the same row. Keysets having interlocking buttons of this kind are well known, one being shown in United States Patent #1,105,545 to E. E. Clement, dated July 28, 1914. Keys 207, 208 and 209 serve certain purposes to be described. The keys in the other three rows are connected to the register 240—249' to control the sending of impulses over the control trunk 260, 261 for effecting a selective switching operation at the substation. Thus key 206 controls the second counting relay 240' and key 205, the fourth counting relay 241'. Likewise keys 210, 211—219 in the second column control the second, fourth—twentieth counting relays 240', 241'—249' (only fourteen counting relays are shown but twenty are indicated by the numbering arrangement). The keys 220—229 in the third column are similarly connected to the register. Relays 233, 234 and 236 are energized in order and at the proper times to render effective the adjustment of the various rows of keys in proper sequence.

Since it is desired to close the contactor 11, the key 206 is depressed, and the keys 210 and 220 corresponding to the switching operation required to select the contactor 11. The key 207 is then actuated, closing a circuit from ground through the winding of relay 250 to grounded battery. Relay 250 becomes energized and locks up through its right hand armature and front contact to ground at the armature and front contact of relay 230. Through its left hand armature and front contact, the relay 250 closes a circuit including the break contacts of relay 252, the upper armatures and back contacts of relays 237, 236, 235, 234 and 233 and the contacts of key 206 for energizing relay 240'. Relay 240' becomes energized, and closes a circuit from ground at relay 250 through the right hand outer armature and back contact of relay 240, the right hand outer armature and front contact of relay 240' and the winding of relay 251 to grounded battery. Relay 251 becomes energized and closes through its armature and front contact an energizing circuit for the slow relay 252 from ground at relay 250, front contact and armature of relay 251, winding of relay 252 and battery to ground.

Relay 252 becomes energized, closes in its make-before-break contacts a locking circuit for relay 240' to ground at relay 250 and opens the above described energizing circuit for relay 240'. Relay 252 also closes a circuit from ground at relay 250 through its right hand outer armature and front contact, the lower armatures and back contacts of relays 236 and 234, and the winding of relay 233 to grounded battery. Relay 233 becomes energized and locks up through its lower armature and front contact, and the lower armatures and back contacts of relays 235—237 to ground at relay 250.

Another circuit closed upon the energization of relay 252 extends from grounded battery through its left hand armature and front contact, the left hand armature and back contact of relay 253, the winding of impulse relay 254, the left hand outer armature and front contact of relay 255, conductor 261 extending to the substation, the right hand armature and front contact of relay 270, the armatures and back contacts of relays 272 and 273, the winding of impulse relay 275, and the break contacts of relay 276 to ground. Relays 254 and 275 become energized.

Figure 3:
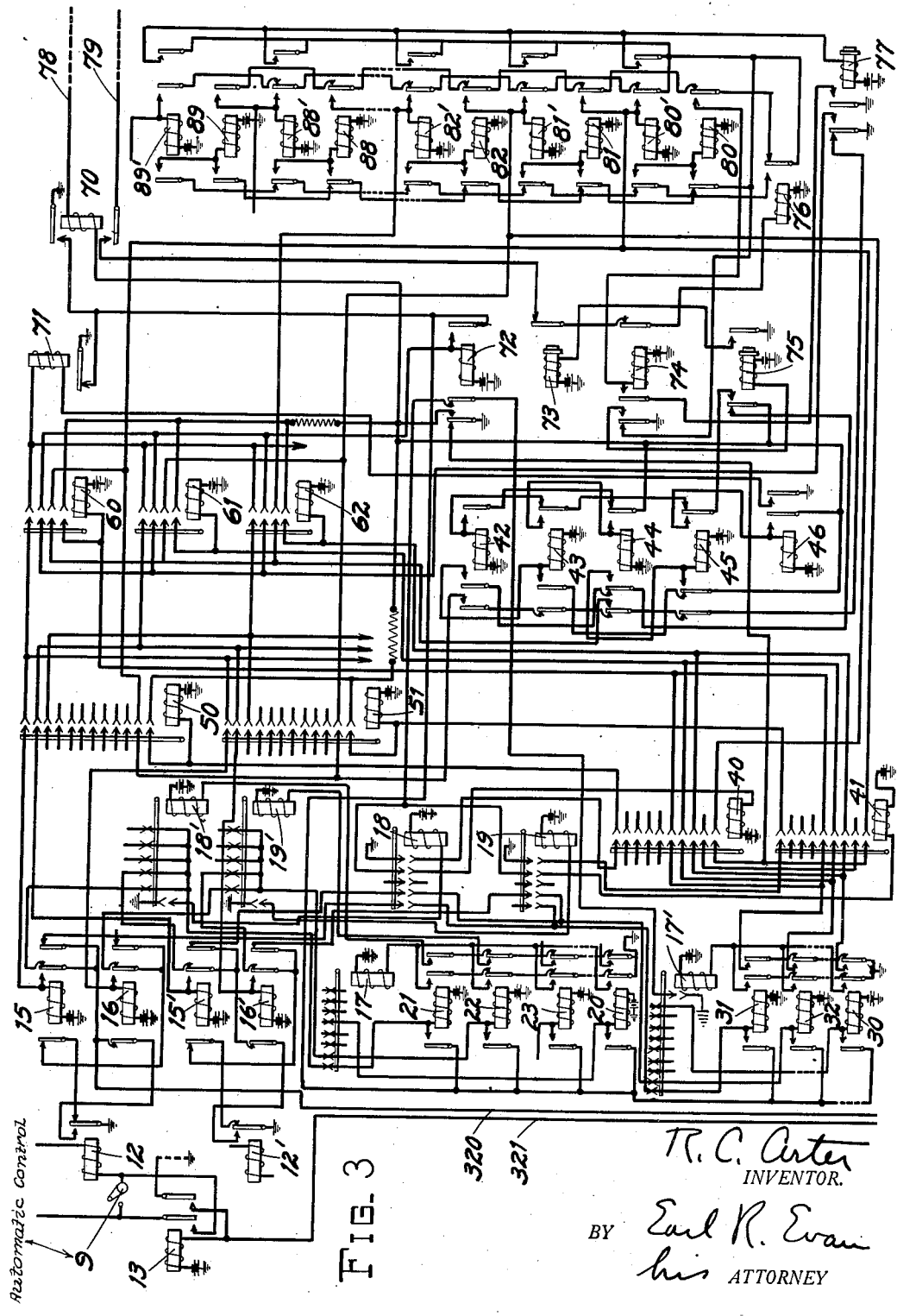
Figs. 3 and 4 illustrate the detailed circuits and apparatus at the substation and at the control office respectively employed in connection with the supervisory function, as shown in outline in the upper halves of Figs. 1 and 2.
Figure 4:
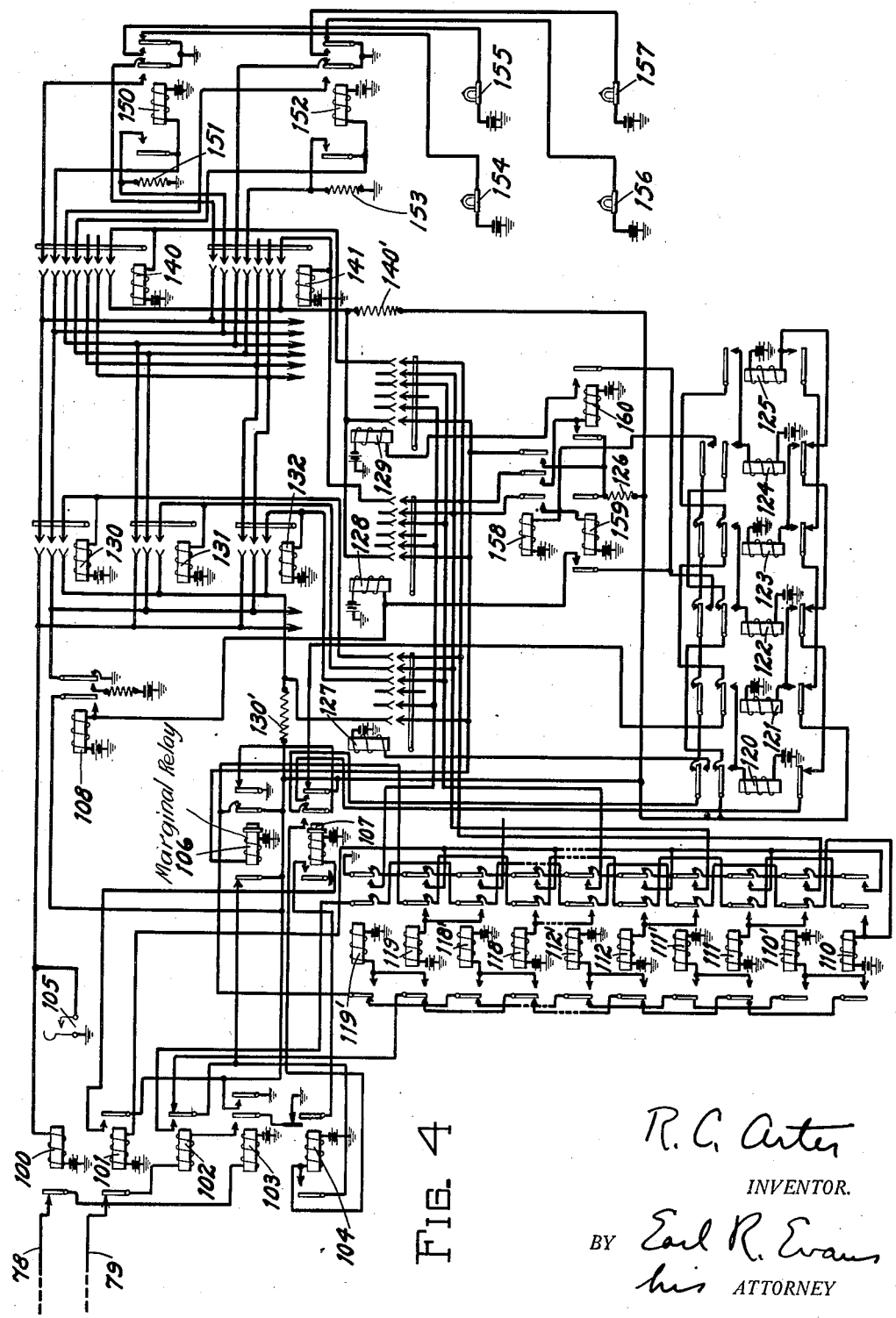

Relays 254 and 275 are the impulse relays which control the control office register 240—249' and the substation register 290—299', corresponding to the relays 76 and 102 (Figs. 3 and 4). Under the control of the substation register, the interrupter relay 272, corresponding to relay 101 (Fig. 4) is intermittently operated to interrupt the circuit of the impulse relays until the control office register is restored to normal. The last register relay 240 operates slow relay 253, corresponding to relay 73 to open the controlling circuit and suspend operations until the stage of the switching operation being described is completed at the substation. The substation register 290—299', having the same number of relays as the control office register 240—249', counts the number of impulses produced by the interrupter relay 272 to restore the control office register to normal, and selectively actuates the switching relays 300 and 310 in accordance with that number.

At the end of each series of impulses, the slow relay 277 releases and renders effective the adjustment of the register, and the operation of the selected relay operates the marginal relay 274, corresponding to relay 106, to release the register and control relays for use in the next stage of the operation. It will be evident that the operation of the registers and the resulting selective operation of the switching relays (Figs. 5 and 6) is similar in some respects to the corresponding apparatus and circuits already described (Figs. 3 and 4) and it will not be necessary to describe each step of the operation in detail.

Upon the energization of relay 254 as described, relay 240 becomes energized. Relay 240 opens the circuit of relay 251 and closes the circuit of the slow relay 253. The de-energization of relay 251 opens the circuit of slow relay 252 and establishes a locking circuit for the slow relay 253. Upon the de-energization of relay 252, the counting relays 240 and 240' become de-energized and a circuit is established through the outer right hand armature and back contact of relay 252 for energizing relay 234.

The second column of keys 210—219 is now rendered effective and a circuit is closed from ground at the armature of relay 250 through the make-before-break contacts of relay 252, the upper armatures and back contacts of relays 237, 236 and 235, the upper armature and front contact of relay 234, the contacts of key 210, and the winding of relay 240' to grounded battery. Relay 240' closes the circuit of relay 251 whereupon relays 252 and 235 become energized. The impulse circuit including relays 254 and 275 is not closed however until the relay 253 restores its armatures. This relay is adjusted so that this does not occur until the first stage of the switching operation at the substation is completed and the register and control relays released. In practice, this only requires a fraction of a second, and the relay 253 may be adjusted to operate upon a considerable margin of safety without introducing appreciable delay in the operation.

The first stage of the switching at the substation is as follows:—upon the operation of relay 275 as described, counting relay 290 becomes energized. Relay 290 closes the circuit of the interrupter relay 272, whereupon the control circuit is interrupted and slow relay 277 becomes energized. Upon the energization of relay 277, relays 276 and 283 become energized over a circuit from ground at the left hand armature of relay 270, right hand outer armature of relay 274 and its back contact, then in a shunt circuit over middle front contact of relay 277 and winding of relay 276 and a second shunt over outer left hand and front contact of relay 277, middle right hand contact of relays 280 and 281, winding of relay 283 and battery to ground.

Upon the interruption of the control circuit, the impulse relay 275 becomes de-energized, whereupon counting relay 290' becomes energized. The operation of relay 290' breaks the circuit of relay 272, whereupon this relay becomes de-energized. The control circuit is now broken at the control office by relay 253, and the impulse relay 275 does not become re-energized therefore. The controlling impulses having ceased, relay 277 becomes de-energized and closes the circuit of relay 282 over a circuit from ground through battery, winding of relay 282, the right hand armature and front contact of relay 283, the right hand armature and back contact of relay 281, the right hand armature and back contact of relay 279, the inner armature and back contact of relay 274, the back contact and outer right hand armature of relay 277, the outer right hand armature and back contact of relay 274 and left hand armature and front contact of relay 270 to ground. Relay 282 becomes energized and closes the circuit of relay 284 over a circuit from ground through battery, winding of relay 284, the front contact and outer left hand armature of relay 282, the outer left hand armature and back contact of relays 281 to 278 in series, the inner right hand armature and back contact of relay 277, the outer right hand armature and back contact of relay 274 to ground over the armature of relay 270, whereupon a circuit is closed through the outer left hand armature and front contact of relay 290' and the middle armature and front contact of relay 284 for energizing relay 286. Relay 286 becomes energized and locks up through its left hand armature and front contact to ground at relay 270. A circuit is also closed through the left hand armature and front contact of relay 286, the right hand armature and front contact of relay 284 and the winding of the marginal relay 274. The relay 274 operates upon this direct ground though it is adjusted so that it will not operate in series with the ground locking resistance of relay 286. Upon the operation of relay 274, relays 276, 284, 290 and 290' are released, causing in turn the de-energization of relay 274. The preliminary stage of the switching operation is now completed and the apparatus restored to normal in readiness for operation in accordance with the next stage.

Upon the restoration of relay 253, the control circuit including impulse relays 254 and 275 is re-closed, and the next stage of the operation is begun. The energization of relays 254 and 275 causes the energization of the counting relays 240 and 290. Relay 240 breaks the circuit of relay 251 and relay 290 causes the energization of the interrupter relay 272. Upon the operation of relay 272, relays 254, 275 and 277 become de-energized, whereupon relays 253, 290', become energized. Upon the subsequent de-energization of relay 252, relay 236 becomes energized and relays 240 and 240' are released. The third row of keys 220—229 is now rendered effective, and a circuit is closed from ground at relay 250 through the make-before-break contacts of relay 252, the upper armature and back contact of relay 237, the upper armature and front contact of relay 236, the contacts of key 220 and the winding of register relay 240' to grounded battery. Relay 240' becomes energized and closes the circuit of relay 251, whereupon relay 252 becomes energized. The relay 252 closes through its make-before-break contacts a locking circuit for relay 240' and causes the energization of relay 237. The operation stops at this point until the slow relay 253 restores its armatures and closes the control circuit, and, as before, this does not occur until the switching stage being described is completed at the substation and the substation register and control relays restored to normal.

Upon the energization of relay 290', as described, relay 272 becomes de-energized. The controlling impulses having ceased, due to the opening of the control circuit by relay 253 at the control office, slow relay 277 becomes de-energized, whereupon relay 280 becomes energized. A circuit is now closed from ground at relay 270 through the outer armature and back contact of relay 274, the middle armature and back contact of relay 277, the left hand outer armatures and back contacts of relays 278 and 279, the left hand outer armature and front contact of relay 280, the right hand armature and front contact of relay 286, and the winding of relay 287 to grounded battery. Relay 287 becomes energized, whereupon a circuit is closed from ground at the relay 270 through the left hand outer armatures and back contacts of relays 299'—291, the left hand outer armature and front contact of relay 290', the outermost contacts of relay 287 and the winding of relay 300 to grounded battery.

Relay 300 becomes energized and locks up through its lower contacts and the locking resistance 300' to ground at relay 270. At the same time, the relay 300 extends its operating ground through its lower contacts and the innermost contacts of relay 287 to the marginal relay 274. The relay 274, which does not become energized in series with the resistance 300', now becomes energized over this direct ground connection and releases the counting relays 290 and 290' and relays 287 and 276. The substation apparatus is now restored to normal in readiness for the next stage of the operation.

This stage is substantially the same as that just described. Relays 240' and 240 of the control office register are energized successively and cause the energization of the first two relays 290 and 290' of the substation register. Relay 277 becomes energized at the commencement of the series of controlling impulses and causes the energization of relays 279 and 276. At the end of the series of impulses, relays 251, 252 and 277 become de-energized, whereupon relays 238 and 278 become energized. A circuit is now closed from ground through the middle armature and front contact of relay 278 and the winding of relay 273 to grounded battery, whereupon relay 273 becomes energized. Another circuit closed upon the energization of relay 278 extends from ground at relay 270 through the middle armature and back contact of relay 277, the outer left hand armature and front contact of relay 278 and the winding of relay 289 to grounded battery.

Relay 289 becomes energized, whereupon a circuit is closed from ground at relay 270 through the outer left hand armature and front contact of relay 290', the outermost contacts of relay 289 and the winding of relay 310 to grounded battery. Relay 310 becomes energized and closes a circuit through its lower contacts and the innermost contacts of relay 289 for operating relay 274. The operation of relay 274 releases relays 290, 290', 276 and 289, the relay 310 remaining locked up through the locking resistance 310' to ground at relay 270.

Upon the operation of relay 310, a circuit is closed from ground through the uppermost contacts of relays 310 and 300, conductor 320 and the right hand armatures and back contacts of relay 15 to the substation supervisory apparatus (Fig. 3). A signal is transmitted to the control office as described above just as if the contactor 11 was already closed. When the operator observes this signal, he knows that the proper apparatus unit has been selected by the controlling apparatus and the desired operation of said unit predetermined.

Upon the energization of relay 238, as described, a circuit is closed from ground through the upper armature and front contact of relay 238, and the lamp 232 to grounded battery. The lamp 232 lights and indicates to the operator that the selecting operation is completed and the circuit prepared for operating the selected unit. He may either operate, or release the controlling apparatus at this point without operating. The former is effected by actuating the operate key 208, whereupon a circuit is closed from ground through the contacts of this key, the lower armature and front contact of relay 238, the left hand outer armature and front contact of relay 255, conductor 261, the right hand armature and front contact of relay 270, the right hand armature and back contact of relay 272, the armature and front contact of relay 273 and the winding of relay 271 to grounded battery. Relay 271 becomes energized and closes a circuit from ground through its armature and front contact, the second contacts of relay 310, the tenth contacts of relay 300, conductor 321 and the winding of relay 13 to grounded battery. Relay 13 becomes energized and closes through its inner armature and front contact the energizing circuit of the contactor 11 and the supervisory relay 12.

The control apparatus may now be restored to normal by actuating the release key 209. Upon opening the contacts of this key, relays 230 and 270 become de-energized. Upon the de-energization of relay 230, the guard lamp 231 is extinguished and relays 250 and 255 are de-energized, causing in turn the de-energization of relays 237, 238 and 271, and of the lamp 232. Upon the de-energization of relay 270, relays 278, 279, 286, 300 and 310 become de-energized. The controlling apparatus at the control office and the substation is now restored to normal. It is evident that this release might have been effected at any stage of the operation, if it had been found desirable, as the release of the apparatus is at all times dependent upon the relays 230 and 270.

I have shown the relay 13 locked up through the back contact of a restoring relay 14. When it is desired to trip the contactor 11 or restore it to normal operation, the relay 14 is energized in a similar manner to that described in connection with relay 13, whereupon the relay 13 becomes de-energized. In effecting this operation, the trip key 205 is actuated instead of the close key 206. The key 205 being connected to the fourth relay 241' of the control office register, obviously more impulses are sent over the control circuit since the relay 214' is further up in the chain than relay 240' and thereafter takes more impulses to reach it in the preliminary series. The third and fourth relays 291 and 291' in the substation register remain energized at the conclusion of this series of impulses.

The relay 285 is now energized instead of the relay 286, as described above, through a circuit including the outer left hand armatures and front contacts of relays 284 and 291'. Subsequently the relay 288 is energized instead of the relay 287, as described above, the relay 288 being controlled by relay 285 in exactly the same way as the relay 287 was described as controlled by relay 286. The alternate relays 300, 301, etc., are connected to the contacts of relays 287 and 288, as indicated. Relays like 13 controlling the closing of contactors are connected to the contacts of relays like 300 selected by the key 206, whereas relays like 14 (see Fig. 1) are connected to the contacts of relays like 301 selected by the key 205.

Upon the operation of relays 301 and 310, a circuit is closed through the contacts of relay 16 for operating the supervisory apparatus as though the contactor 11 had already been opened. When the operate key is actuated, relay 271 becomes energized and closes a circuit through the contacts of relays 310 and 301 for operating relay 14.

The controlling apparatus is then released as before.

The trunk 260, 261 may also be used to establish telephonic communication between the substation and the control office. As indicated, in Figs. 1 and 2, the telephone apparatus is connected to the trunk through condensers. This apparatus may be of the usual local battery magneto type, and may be connected in any desired manner that will effect the transfer of the talking and signalling pulsations of current to the trunk 260, 261.

In practice, there may be a plurality of substations associated with one control office and it will be apparent that the system described herein is particularly applicable to such substation systems. At each substation, an arrangement of apparatus like that shown in Figs. 3 and 6 would be provided. At the control office, supervisory equipment like that shown in Fig. 4 is provided for each substation. The controlling apparatus of Fig. 5 is common however to all of the substations. The operation of such a system will be clearly understood without duplication of the drawings and repetition of the description.

I claim:

1. In a supervisory control system, a first station, a second station, apparatus units at said second station, indicating means at said first station, means at said first station for selecting one of said apparatus units for operation, means at said second station for operating one of said indicating means at said first station individual to said selection, means for operating said selected unit, and means including said indicating operating means for providing an indication at said first station of any operation of any one of said units.

2. In a supervisory control system, a first station, a second station, devices operable to a plurality of positions at said second station, signalling devices at said first station, a transmitter at said second station, means whereby said transmitter transmits impulses individually characteristic of the operating position of said devices, means controlled by the transmitted impulses for operating a selected signal device, means for selecting one of said devices from said first station, and means whereby said transmitter also transmits to said first station impulses characteristic of the selection made at said second station.

3. In a supervisory control system, a first station, a second station, apparatus units at said second station, signalling devices individual to said units at said first station, a normally non-operating code transmitter comprising a chain of relays operating sequentially, means for starting said transmitter into operation upon the operation of any one of said apparatus units for transmitting a code individual to said unit to said first station, means responsive to said code for selecting a signalling device individual to said unit, means for selecting one of said units for operation from said first station, and means for selectively starting said transmitter into operation from said first station responsive to said selection.

4. In a supervisory control system, a first station, a second station, apparatus units at said second station, signalling devices at said first station, a control and a supervisory line connecting said stations, means including said control line for selecting one of said apparatus units for operation, means including said supervisory line and said signalling devices for selectively indicating at said first station, the unit selected for operation, means including said control line for operating the selected unit, and means including said supervisory line for giving a visual indication at said first station of the operation of any one of said units.

5. In a supervisory control system, a first station, a second station, a plurality of apparatus units at said second station, means for operating each of said apparatus units, each having a plurality of operating positions, signalling devices at said first station individual to each of said apparatus units, a normally non-operating transmitter at said second station started into operation in response to the operation of any one of said apparatus units, means controlled by said transmitter for transmitting impulses characteristic of the operated device and its position, means operative in the event of a simultaneous operation of a plurality of said apparatus units for associating said transmitter with each of said units in sequence, means controlled by said transmitted impulses for operating the signalling device individual to said apparatus unit, means for selecting one of said apparatus units from said first station and means whereby said transmitter also transmits to said first station impulses characteristic of the selection made at the second station.

6. In a remote control system, a plurality of switching devices, signalling means and means whereby said signalling means is operated to indicate the operated or non-operated condition of said devices, means for selecting any of said devices and operating the same, and means for operating said signalling means in a distinctive manner whenever a device is selected to indicate which of the devices has been selected.

7. In a remote control system, a plurality of devices, signalling means and means whereby said signalling means is operated to indicate the position of said devices, means for selecting a device over either of two paths to change the position of the device, and means for operating said signalling means in a distinctive manner in response to said selection to indicate that the proper device has been selected and also to indicate that the device is in the position from which it may be operated over the path selected.

8. In a remote control system, a plurality of switching devices, each having a plurality of positions, a control switch for selecting said devices, signals corresponding to said devices and always indicating the position of the devices, means for operating said control switch to select a particular device, and means responsive to said selection for operating the signals corresponding to the selected device in a particular manner to indicate if the device is in the position indicated by the signals.

9. In a remote control system, a plurality of switching devices, each having a plurality of positions, a control switch for selecting said devices, signals corresponding to said devices, and always indicating the position of the devices, means for operating said control switch to select a particular device, and means responsive to said selection for operating the signals corresponding to the selected device in a particular manner to check the accuracy of the selection and the accuracy of the signal indication.

10. In a supervisory control system, in combination, a first station, a second station, a plurality of devices operable to a plurality of positions at said second station, signalling devices at the first station individual to each of said devices, means at the first station operable to transmit impulses individually characteristic of the devices at the second station, means at the second station responsive to the impulses transmitted for selecting a device, means at the second station operable in response to the selection thereat for transmitting a series of impulses individually characteristic of the selected device to the first station, means at the first station controlled by said impulses for operating the signalling device individual to the selected device, means at said first station for operating the selected device, and means responsive to the operation of any one of the devices for effecting the operation of the signalling means individually thereto at the first station.

11. In a supervisory control system, a first station, a second station, devices operable to a plurality of positions at the second station, indicating means at the first station, means at said first station including normally non-operating selectors at both stations for selecting one of said devices for operation, means at said second station including other normally non-operating selectors at both stations responsive to the selection for effecting the operation of an indicating means at the first station individually characteristic of the device selected, means for operating the selected device from the first station, and means at said second station including said other normally non-operating selectors for operating the indicating means at the first station for indicating at said first station the position of the device.

12. In a remote control system, a first station, a second station, a plurality of devices operable to a plurality of positions at the second station, signalling means at the first station, a code transmitter and a code receiver at said stations, control and supervisory lines connecting the stations, means at the first station including the code transmitter thereat the control line and the receiver at the second station for selecting a device, means at the second station including the code transmitter thereat the supervisory line and the receiver at the first station for operating a signalling means individual to the selected device, means at the first station whereby the selected device may be operated, and means at the second station whereby the code transmitter thereat the supervisory line and receiver at the first station operates the signalling device in accordance with the operating position of the device.

ROY C. ARTER.